Patented Jan. 13, 1925.

1,523,029

UNITED STATES PATENT OFFICE.

MARTIN L. MARTUS, OF WOODBURY, CONNECTICUT.

ELECTRODE ELEMENT FOR GALVANIC BATTERIES AND METHOD OF PRODUCING SAME.

No Drawing. Application filed February 8, 1922. Serial No. 535,046.

*To all whom it may concern:*

Be it known that MARTIN L. MARTUS, a citizen of the United States, and resident of Woodbury, in the county of Litchfield and State of Connecticut, has invented certain new and useful Improvements in Electrode Elements for Galvanic Batteries and Methods of Producing Same, of which the following is a specification.

My invention relates to improvements in galvanic batteries and more particularly to the method of producing negative electrode elements therefor.

Primary battery negative elements of the class described are at the present time almost universally made of finely divided oxide of copper, which is usually ground fine from a commercial form of oxide of copper scale. The majority of commercial elements as now manufactured from oxide of copper of this class, is made up in the form of cylinders or plates, and includes a mass of the said material that is converted into a solid form by first thoroughly mixing the powdered copper with a binder, such as caustic soda, and while in this damp, pliable form, is placed into a suitable mold of proper form and dimension according to style of finished element desired, and tightly pressed together to form an integral self-supporting element. The elements as thus formed, are next baked in a suitable oven and under a relatively high degree of heat for a suitable period of time so that when removed from the oven and cooled will be sufficiently hard to withstand the necessary handling, shipping and usage required of them, without breakage.

My experience in the manufacture of both plate and cylindrical forms of negative elements of this class, has disclosed the desirability of making negative elements of this general type, of a more porous nature so as to be more susceptible to the action of the electrolyte, in the working of the battery.

The further advantage derived from the producing of a more porous element of this character is that it insures a more even voltage throughout the efficient life of a battery as is obviously desirable for certain particular uses for which batteries of this type are employed.

My invention therefore resides in the production of electrode elements for galvanic batteries which will be more porous and efficient than those now in use, and particularly to include in such an element additional materials of different character from those now employed, which will improve the efficiency of the battery, and can be employed with the present molding and heat treating operations now resorted to, and so as to be produced with a relatively small additional cost and prove to be a better product.

I therefore include with my powdered oxide of copper and binder such as the caustic soda solution previously specified, finely divided parts of metal, such for instance as copper filings or grindings which will obviously make the electrode element more conductive, and increase the efficiency of the battery in which it is employed. This use of finely divided metallic copper tends to also make a stronger element due to the action of the heat in the baking operation.

It is also a feature of the invention to include in this mixture of materials prior to the baking operation another material in granular or powdered form which when mixed with the other ingredients before specified will become evenly distributed throughout the body of the pressed element, and which will oxidize or carbonize, in the baking process in a way to dry out so that the body of this material becomes consumed and disappears, thus forming and leaving a relatively large number of small spaces or voids throughout the completed element in a manner which obviously makes it more porous and efficient, than the present form of solid element.

While different forms of materials may be used to advantage to form this filler, yet I find that a material such as granulated sugar, or powdered sulphur, answers the purpose very well, since in this original stage they are sufficiently hard to insure the formation of the required core yet readily respond to the heat treatment whereby the body of the filler becomes destroyed.

I do not wish my patent to be limited to either the use of copper as a particular form of metal to be employed to increase the conductivity of the electrode element or to the employment of sugar or sulphur as a filler since it will be obvious that substitutes for either might be employed and to equally as good advantage.

Having thus described my invention, what I claim and desire to secure by Letters Patent is:—

1. An electrode composition for galvanic battery elements comprising an agglomerated mass of finely divided oxide of copper, a finely divided non-metallic filler, a binder of caustic soda and a portion of finely divided parts of metal, said mass being adapted to be shaped to desired form, pressed and baked to solidify and harden the element.

2. An electrode element for galvanic batteries comprising an agglomerated mass of finely divided oxide of copper, a raw copper to improve the conductivity, said mass being adapted to be moulded, pressed and baked to harden the element.

3. An electrode composition for galvanic battery elements comprising an agglomerated mass of finely divided oxide of copper, a binder of caustic soda, and a filler of material adapted to be destroyed by heat and to produce a porous electrode when finished by pressing and baking.

4. An electrode element for galvanic batteries formed from an agglomerated mass of finely divided oxide of copper, an alkali binder, a portion of finely divided parts of metal and a filling of granular consumable material, said mass being adapted to be shaped to form and baked to consume the granular material and harden the electrode.

5. An electrode element for galvanic batteries formed from an agglomerated mass of finely divided oxide of copper, a filler of granular destroyable material and a suitable binder, said mass being adapted to be pressed to form and baked to destroy the granular material and to harden the electrode.

6. An electrode element for galvanic batteries, comprising a baked mass of oxide of copper a finely divided non-metallic filler, caustic soda and finely divided parts of metal, substantially as described.

7. An electrode composition for galvanic battery elements, comprising a baked mass of oxide of copper, caustic soda and granular sugar, substantially as described.

8. An electrode element for galvanic batteries, comprising a baked mass of oxide of copper, caustic soda, finely divided parts of metal and residue from baked granular sugar adapted to produce voids, substantially as described.

9. An electrode element for galvanic batteries, comprising an agglomerated mass of finely divided oxide of copper, raw copper to improve the conductivity, a filler of material adapted to be destroyed by heat and to form a porous electrode when finished.

10. An electrode element for galvanic batteries formed from a mass of finely divided oxide of copper, a soda binder, a filler of powdered material adapted to be consumed by the application of heat to produce voids.

11. An electrode element for galvanic batteries formed from a mass of finely divided oxide of copper, a soda binder, finely divided particles of metals, a filler of powdered material adapted to be consumed by the application of heat to produce voids.

12. An electrode composition for galvanic battery elements, including a heat affected combustible material adapted to be burnt out by heating during the process of manufacture of the element to produce voids.

13. An electrode composition for galvanic battery elements comprising oxide of copper, an alkali binder and a material which will disintegrate under the application of heat to produce voids.

14. An electrode composition for galvanic battery elements, comprising oxide of copper combined with a principle material adapted to be disintegrated by heating during the process of manufacture of the element to produce voids.

15. An electrode composition for galvanic battery elements comprising an agglomerated mass of finely divided oxide of copper, suitable binder, a portion of finely divided parts of metal, a portion of finely divided vegetable material, said mass being adapted to be shaped to desired form, pressed and baked to solidify and harden the element.

16. An electrode composition for galvanic battery elements comprising an agglomerated mass of finely divided oxide of copper, suitable binder, a portion of finely divided parts of metal, a portion of finely divided animal matter, said mass being adapted to be shaped to desired form, pressed and baked to solidify and harden the element.

17. An electrode composition for galvanic battery elements comprising an agglomerated mass of finely divided oxide of copper, suitable binder, a portion of finely divided mineral matter, said mass being adapted to be shaped to desired form, pressed and baked to solidify and harden the element.

Signed at Waterbury, in the county of New Haven and State of Connecticut this 6th day of February, A. D., 1922.

MARTIN L. MARTUS.

Witnesses:
JAMES G. ROSS,
H. T. HUBERT.